(12) United States Patent
Shibamori et al.

(10) Patent No.: US 10,633,830 B2
(45) Date of Patent: Apr. 28, 2020

(54) SAFETY DEVICE FOR A CONSTRUCTION MACHINE

(71) Applicant: Hitachi Construction Machinery Co., Ltd., Taito-ku, Tokyo (JP)

(72) Inventors: Kazuhiro Shibamori, Ibaraki (JP); Hidenobu Tsukada, Ibaraki (JP); Keiichiro Nakamura, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/754,746

(22) PCT Filed: Oct. 28, 2016

(86) PCT No.: PCT/JP2016/082138
§ 371 (c)(1),
(2) Date: Feb. 23, 2018

(87) PCT Pub. No.: WO2017/141500
PCT Pub. Date: Aug. 24, 2017

(65) Prior Publication Data
US 2018/0245313 A1    Aug. 30, 2018

(30) Foreign Application Priority Data

Feb. 17, 2016   (JP) .................................. 2016-028415

(51) Int. Cl.
*E02F 9/24*   (2006.01)
*E02F 9/26*   (2006.01)
(Continued)

(52) U.S. Cl.
CPC .................. *E02F 9/24* (2013.01); *E02F 9/26* (2013.01); *E02F 9/268* (2013.01); *B60Q 3/70* (2017.02); *B60Q 5/005* (2013.01); *B60Q 9/00* (2013.01)

(58) Field of Classification Search
None
See application file for complete search history.

(56) References Cited

U.S. PATENT DOCUMENTS

2006/0200283 A1   9/2006 Furuno et al.
2010/0000367 A1   1/2010 Akahane et al.
(Continued)

FOREIGN PATENT DOCUMENTS

JP    11-22269 A    1/1999
JP    11022269 A  *  1/1999
(Continued)

OTHER PUBLICATIONS

Hideyuki et al. (JP2012021362) machine translation.*
(Continued)

*Primary Examiner* — Curtis A Kuntz
*Assistant Examiner* — Shawna M Kingston
(74) *Attorney, Agent, or Firm* — Crowell & Moring LLP

(57) ABSTRACT

A safety device for a construction machine includes a status information acquisition section that acquires status information pertaining to the status of the construction machine, a seat belt detection section that detects whether an operator is wearing a seat belt, and a control section that controls a warning section so that a warning is given on the basis of the status information when the operator is not wearing the seat belt, in which the status information includes information pertaining to the operation position of a gate lock lever that is manipulated to a lock position in which instructions from operating levers of the construction machine are disabled and a lock release position in which instructions from the operating levers are enabled, and the control section controls the warning section so that a warning is given when the gate lock lever operation position is at the lock release position.

3 Claims, 9 Drawing Sheets

(51) Int. Cl.
*B60Q 9/00* (2006.01)
*B60Q 3/70* (2017.01)
*B60Q 5/00* (2006.01)

(56) References Cited

U.S. PATENT DOCUMENTS

2013/0245897 A1* 9/2013 Linstroth ............... E02F 3/435
                                                              701/50
2016/0272150 A1* 9/2016 Doshi ..................... B60R 22/48

FOREIGN PATENT DOCUMENTS

| JP | 2007-154473 A | 6/2007 |
| JP | 2007-327190 A | 12/2007 |
| JP | 2012-21362 A | 2/2012 |
| JP | 2013-159193 A | 8/2013 |
| JP | 2015-128952 A | 7/2015 |
| WO | WO 2016/016978 A1 | 2/2016 |

OTHER PUBLICATIONS

International Search Report (PCT/ISA/210) issued in PCT Application No. PCT/JP2016/082138 dated Jan. 24, 2017 with English translation (Four (4) pages).

Japanese-language Written Opinion (PCT/ISA/237) issued in PCT Application No. PCT/JP2016/082138 dated Jan. 24, 2017 (Five (5) pages).

* cited by examiner

SAFETY DEVICE FOR A CONSTRUCTION MACHINE

TECHNICAL FIELD

The present invention relates to a safety device for a construction machine.

BACKGROUND ART

From the past, such a construction machine has been known that operation by an operation tool is disabled when an event that an operator is wearing a seat belt is not detected by a seat belt sensor (Patent Literature 1).

CITATION LIST

Patent Literature

PATENT LITERATURE 1: JP-A No. 2012-021362

SUMMARY OF INVENTION

Technical Problem

However, according to the construction machine described in Patent Literature 1, since the operation is disabled when the seat belt is not worn, a problem possibly occurs according to the state of the construction machine.

Solution to Problem

The safety device for a construction machine according to an aspect of the present invention is a safety device for a construction machine, comprising a status information acquisition section that acquires status information pertaining to the status of the construction machine, a seat belt detection section that detects whether an operator is wearing a seat belt, and a control section that controls a warning section so that a warning is given on the basis of the status information when the operator is not wearing the seat belt, wherein the status information includes information pertaining to the operation position of a gate lock lever that is manipulated to a lock position in which instructions from operating levers of the construction machine are disabled and a lock release position in which instructions from the operating levers are enabled, and the control section controls the warning section so that a warning is given when the gate lock lever operation position is at the lock release position.

Advantageous Effect of Invention

According to the present invention, it is possible to alert an operator according to the status of the construction machine.

DESCRIPTION OF EMBODIMENTS (First Embodiment)

Figure 1:
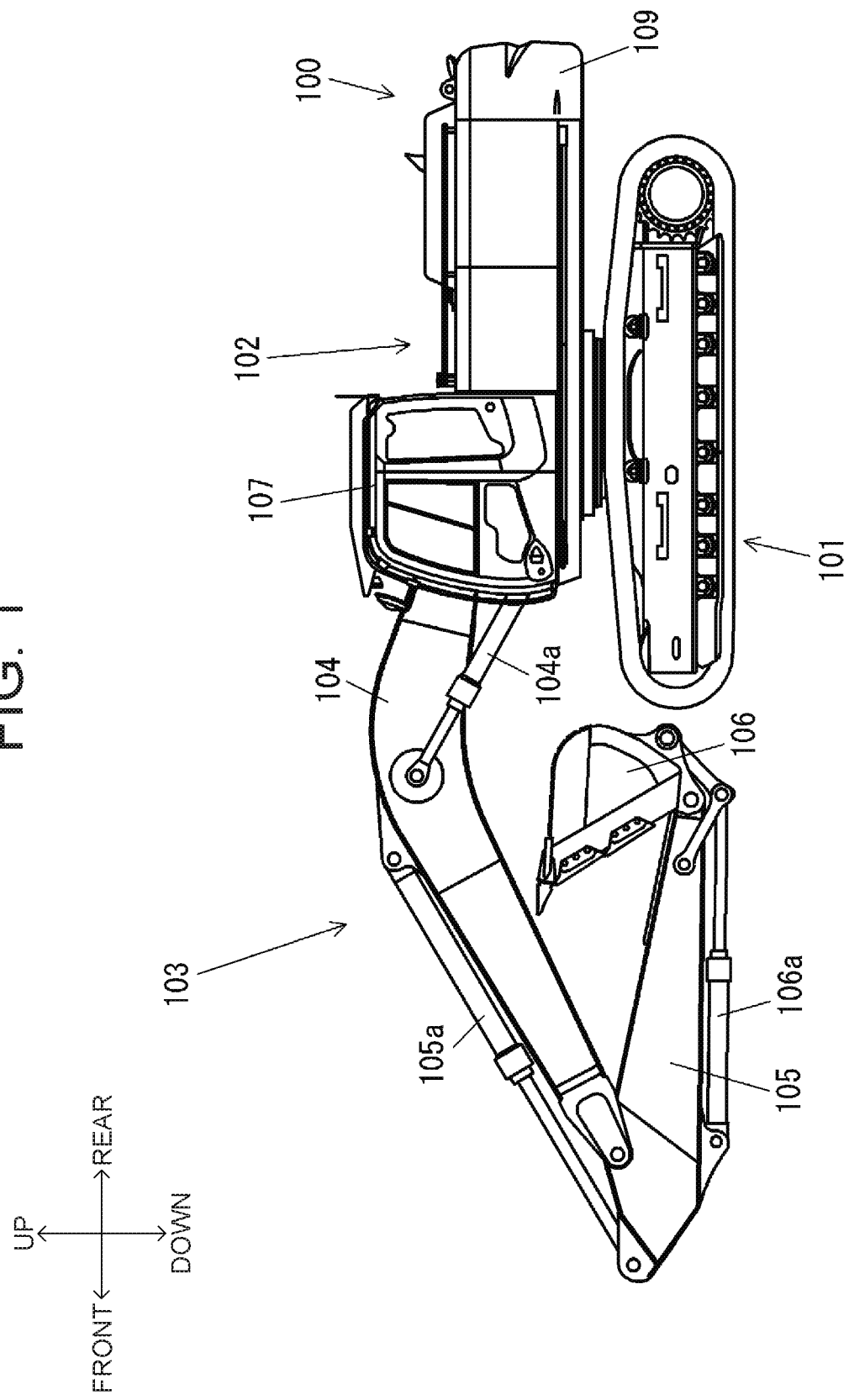
FIG. 1 is a side view of a hydraulic excavator 100 that is an example of a construction machine.

FIG. 1 is a side view of a hydraulic excavator 100 that is an example of a construction machine. In addition, for the sake of the convenience of explanation, the front-rear and the top-bottom directions of the hydraulic excavator 100 are defined as shown in FIG. 1. The hydraulic excavator 100 includes an under-carriage 101 and an upperstructure 102 that is turnably arranged on the under-carriage 101. A front working device 103 is arranged at the front part of the upperstructure 102.

The front working device 103 includes a boom 104, an arm 105, and a bucket 106. The boom 104 is attached to a frame of the upperstructure 102 so as to be rotatable in the vertical direction with respect to the upperstructure 102. The boom 104 is driven by a boom cylinder 104a to be lifted/lowered.

The arm 105 is attached to the distal end of the boom 104 so as to be rotatable in the vertical direction with respect to the boom 104. The arm 105 is driven by an arm cylinder 105a to be lifted/lowered. The bucket 106 is attached to the distal end of the arm 105 so as to be rotatable in the vertical direction with respect to the arm 105. The bucket 106 is driven by a bucket cylinder 106a.

In the frame of the upperstructure 102, a cab 107 where an operator gets in and a counterweight 109 are provided. In the cab 107, a warning section 30, a key switch section 40, a seat belt switch section 50, and a gate lock lever section 60 are arranged (refer to FIG. 2). Operating levers are also provided in the cab 107. The operating levers instruct drive of the front working device 103 and the upperstructure 102.

Figure 2:
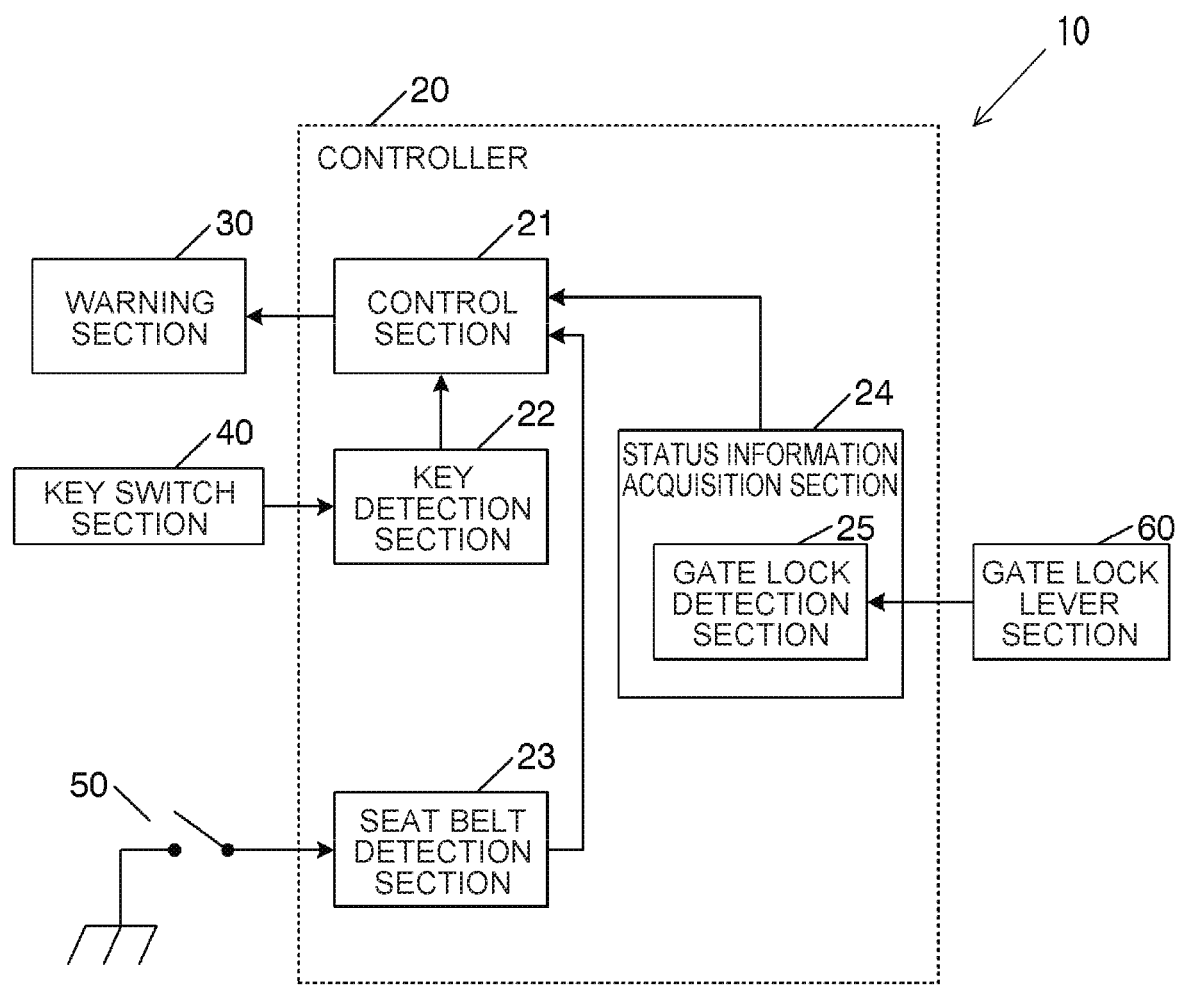
FIG. 2 is a block diagram that shows a configuration of a safety device 10 related to a first embodiment.

FIG. 2 is a block diagram that shows a configuration of a safety device 10 related to a first embodiment. The safety device 10 is configured so as to include a controller 20. The warning section 30 is controlled by the controller 20. The controller 20 is configured so as to include an arithmetic processing device, the arithmetic processing device including a CPU, a ROM, a RAM, other peripheral circuits, and the like, the ROM and the RAM being storing devices.

The controller 20 functionally includes a control section 21, a key detection section 22, a seat belt detection section 23, and a status information acquisition section 24. The controller 20 is connected to the warning section 30, the key switch section 40, the seat belt switch section 50, the gate lock lever section 60, and the like.

The gate lock lever section 60 includes a gate lock lever and a gate lock switch section. The gate lock lever is arranged at the entrance of the cab 107, and is selectively manipulated to a lock position in which instructions from the operating levers of the hydraulic excavator 100 are disabled and a lock release position in which instructions from the operating levers are enabled. The lock position is a status of lifting the gate lock lever (a position for opening the entrance of the cab 107), for example. The lock release position is a status of lowering the gate lock lever (a position for restricting the entrance of the cab 107), for example. The gate lock switch section outputs a status signal that corresponds to the operation position of the gate lock lever to the controller 20. As the status signal, the gate lock switch section outputs an ON-signal when the gate lock lever is at the lock release position, and outputs an OFF-signal when the gate lock lever is at the lock position, for example.

The status information acquisition section 24 acquires status information that is information pertaining to the status of the hydraulic excavator 100. The status information acquisition section 24 is configured so as to include a gate lock detection section 25.

The gate lock detection section 25 acquires the status signal acquired by the gate lock lever section 60 as it is or after signal processing as gate lock lever status information. The signal processing is processing for removing the noise component of the signal, for example.

The seat belt switch section 50 outputs an electric signal that corresponds to the wearing status of the seat belt to the seat belt detection section 23. The seat belt detection section 23 detects whether the seat belt is worn by the operator on the basis of the electric signal outputted by the seat belt switch section 50. The seat belt detection section 23 generates a detection signal (a seat belt status signal) that corresponds to the detection result.

The key switch section 40 outputs an electric signal that corresponds to the operation position of a key of the hydraulic excavator 100 to the key detection section 22. The key detection section 22 detects the operation position of the key on the basis of the electric signal outputted by the key switch section 40. The operation position of the key is the ON-position and the OFF position, for example. The key detection section 22 generates a detection signal (a key status signal) that corresponds to the detection result.

The control section 21 controls the warning section 30 so that a warning is given to the operator on the basis of the gate lock lever status information and the seat belt status signal, the gate lock lever status information being the status information of the hydraulic excavator 100 acquired by the status information acquisition section 24, the seat belt status signal being acquired by the seat belt detection section 23. The control section 21 generates a warning control signal on the basis of the status information of the hydraulic excavator 100, and changes the mode of warning given by the warning section 30. The control section 21 outputs the generated warning control signal to the warning section 30.

The warning section 30 gives a warning to the operator on the basis of the warning control signal outputted by the control section 21. The warning section 30 is configured so as to include a display section and a sound notification section. The display section is a liquid crystal display, for example, and displays various types of measuring instruments and a warning lamp, the various types of measuring instruments being a fuel residual quantity gauge and the like. The warning lamp includes a seat belt warning lamp and the like, for example, the seat belt warning lamp showing whether the operator wears the seat belt. The sound notification section is configured of a speaker and the like, and outputs a warning sound. The control section 21 raises the warning degree (attention arousing performance) of the warning by changing the mode of the warning given by the warning section 30. Here, to raise the warning degree (attention arousing performance) of the warning means to increase the sense of urgency of the operator. As an example of raising the warning degree (attention arousing performance) of the warning, flickering the warning lamp, increasing the flickering speed of the warning lamp, turning up the sound volume of the warning sound, changing the tone of the warning sound, outputting a voice message, and so on can be cited.

Figure 3:
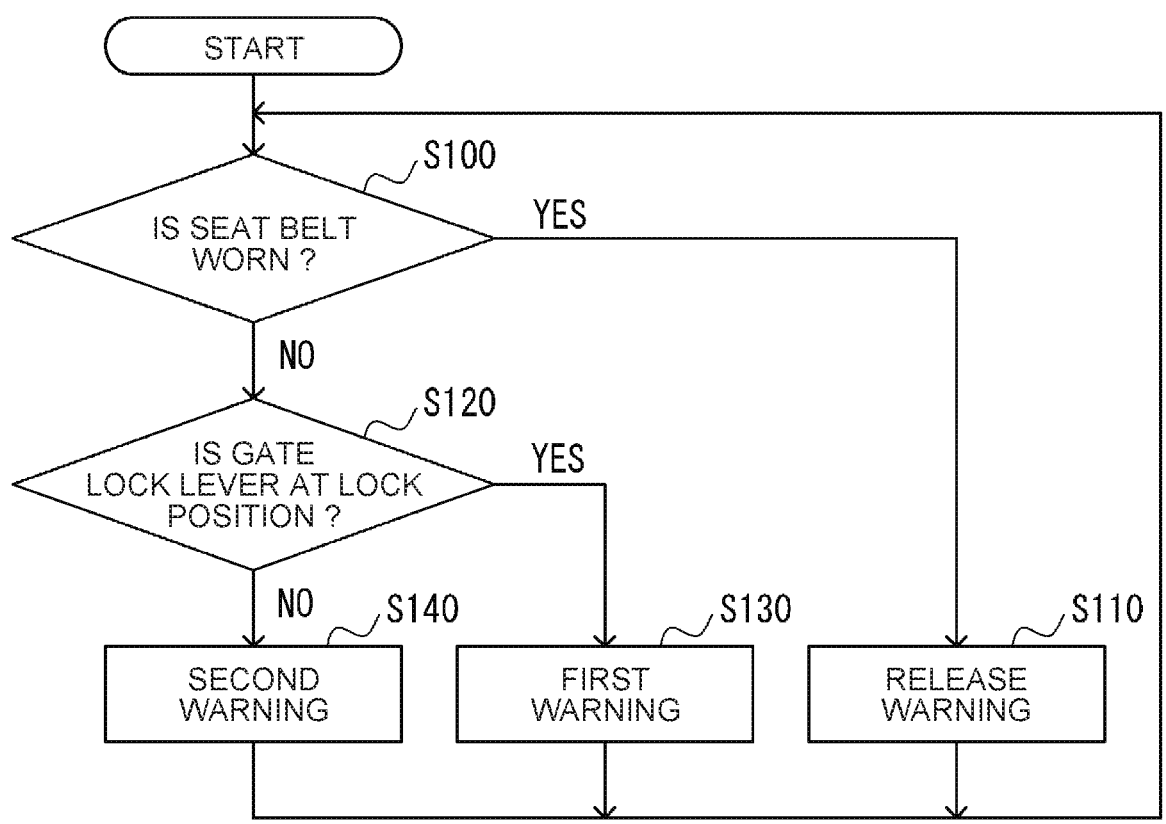
FIG. 3 is a flowchart that shows an example of a process in the safety device 10 related to the first embodiment.

FIG. 3 is a flowchart that shows an example of a process executed in the controller 20. The process shown in the flowchart of FIG. 3 is started, for example, when the controller 20 detects the status that the operation position of the key is ON on the basis of the key status signal.

In step S100, the controller 20 determines whether the seat belt is worn by the operator on the basis of the seat belt status signal. The process proceeds to step S110 when the affirmative determination in step S100, and the process proceeds to step S120 when the negative determination in step S100.

In step S110, the controller 20 controls the warning section 30 so as not to give a warning. The warning section 30 turns off a seat belt warning lamp when the seat belt warning lamp has been turned on, for example.

In step S120, the controller 20 determines whether the operation position of the gate lock lever is the lock position on the basis of the gate lock lever status information. The process proceeds to step S130 when the affirmative determination in step S120, and the process proceeds to step S140 when the negative determination in step S120.

In step S130, the controller 20 controls the warning section 30 so as to give a first warning. The warning section 30 turns on the seat belt warning lamp, for example, as the first warning.

In step S140, the controller 20 controls the warning section 30 so as to give a second warning. In general, such status that the seat belt is not yet worn and the gate lock lever is at the lock release position is a status having a higher degree of risk compared to such status that the seat belt is not yet worn and the gate lock lever is at the lock position because there is a risk of causing the erroneous operation. The controller 20 gives the second warning whose attention arousing performance is higher than that of the first warning. The warning section 30 flickers the seat belt warning lamp, for example, as the second warning.

The motion of the present embodiment can be summarized as follows. When the operator switches the operation position of the key to the ON-position, the hydraulic excavator 100 starts up. The controller 20 of the hydraulic excavator 100 acquires the seat belt status signal and the gate lock lever status signal.

The controller 20 generates the warning control signal on the basis of the seat belt status signal and the gate lock lever status information, and transmits the warning control signal to the warning section 30. The warning section 30 gives the first warning if the seat belt is not yet worn when the gate lock lever is at the lock position, that is, in such status that the front working device 103 and the upperstructure 102 cannot be driven. The warning section 30 gives the second warning whose attention arousing performance is higher than that of the first warning if the gate lock lever is at the lock release position when the seat belt is not yet worn, that is, in such status that the front working device 103 and the upperstructure 102 can be driven. Thus, the controller 20 arouses the attention of the operator by making the warning section 30 give a warning according to the status of the hydraulic excavator 100.

By confirming the warning by the warning section 30, the operator can recognize the status of the hydraulic excavator 100, and can take an appropriate response.

According to the embodiment described above, following actions and effects can be secured.

(1) The safety device 10 for the hydraulic excavator 100 includes the status information acquisition section 24 that acquires the status information pertaining to the status of the hydraulic excavator 100, the seat belt detection section 23 that detects whether an operator is wearing a seat belt, and the control section 21 that controls the warning section 30 so that a warning is given on the basis of the status information when the operator is not wearing the seat belt. The status information acquired by the status information acquisition section 24 includes the information pertaining to the operation position of the gate lock lever that is manipulated to the lock position in which instructions from the operating levers of the hydraulic excavator 100 are disabled and the lock release position in which instructions from the operating levers are enabled. The control section 21 controls the warning section 30 so that a warning is given when the gate lock lever operation position is at the lock release position. According to the present embodiment, it was configured that, when the gate lock lever was at the lock release position, such warning was given that had higher attention arousing performance compared to the case the gate lock lever was at the lock position. Thus, it is possible to alert the operator according to the operation position of the gate lock lever.

(2) The control section 21 controls the warning section 30 so that the mode of the warning changes such as turning on or flickering of the warning lamp according to the status information. Thus, the attention arousing performance to the operator can be improved according to the status of the hydraulic excavator 100.

(3) According to the construction machine described in Patent Literature 1, when it is detected by the seat belt sensor that the seat belt is not yet worn, the operation is disabled. Therefore, when the sensor is damaged, such problem occurs that the construction machine is not operable. In contrast, according to the first embodiment, since a warning is given to the operator according to the status of the hydraulic excavator 100, such event of becoming non-operable when the sensor is damaged can be avoided, and an appropriate response can be taken such as moving the hydraulic excavator 100 from the working site to the maintenance site.

(Second Embodiment)

Figure 4:
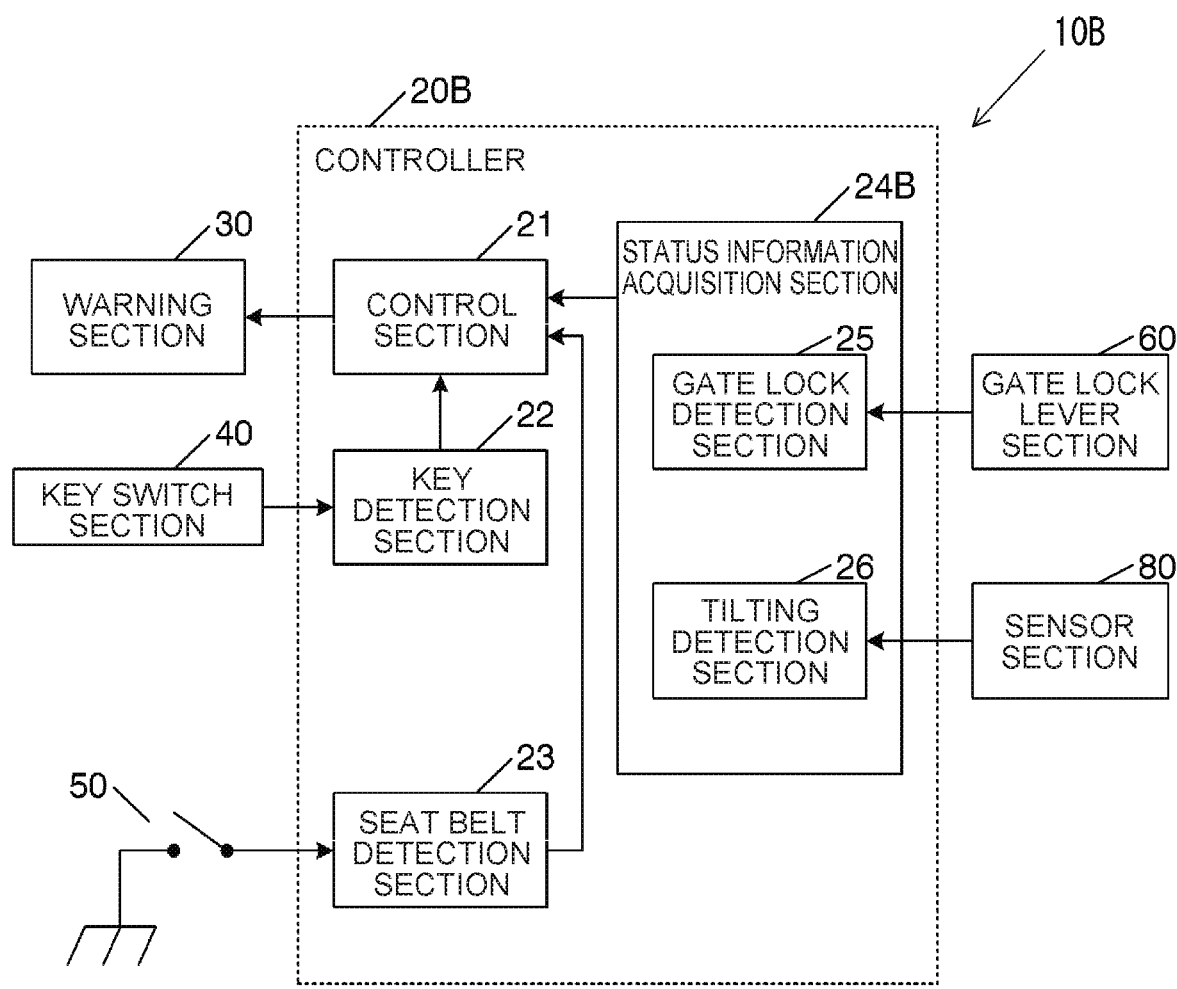
FIG. 4 is a block diagram that shows a configuration of a safety device 10B related to a second embodiment.

A safety device 10B for construction machine related to a second embodiment will be explained referring to FIG. 4. In addition, in FIG. 4, a portion same or equivalent to that of the first embodiment will be given a same reference sign, and different points will be mainly explained. FIG. 4 is a block diagram that shows a configuration of the safety device 10B related to the second embodiment. In the first embodiment, such example was explained that the gate lock lever status information of the hydraulic excavator 100 was used as the status information. In contrast, in the second embodiment, the warning is controlled using the gate lock lever status information and the tilting information of the hydraulic excavator 100 as the status information.

According to the second embodiment, a controller 20B includes a status information acquisition section 24B. The status information acquisition section 24B includes the gate lock detection section 25 and a tilting detection section 26. The controller 20B is connected to the gate lock lever section 60, a sensor section 80, and the like.

The sensor section 80 includes various types of sensors such as a rotational speed sensor that detects the rotational speed of the engine, a tilting angle sensor that detects the tilting angle of the vehicle body relative to the horizontal plane, and a pressure sensor that detects the pilot pressure that corresponds to the operation quantity of the travel pedal. The sensor section 80 outputs the detection signal generated by the various types of sensors to the controller 20B.

The tilting detection section 26 detects the tilting status of the hydraulic excavator 100 on the basis of the detection signal generated by the tilting angle sensor that configures the sensor section 80. The tilting detection section 26 acquires tilting information that corresponds to the detection result.

Figure 5:
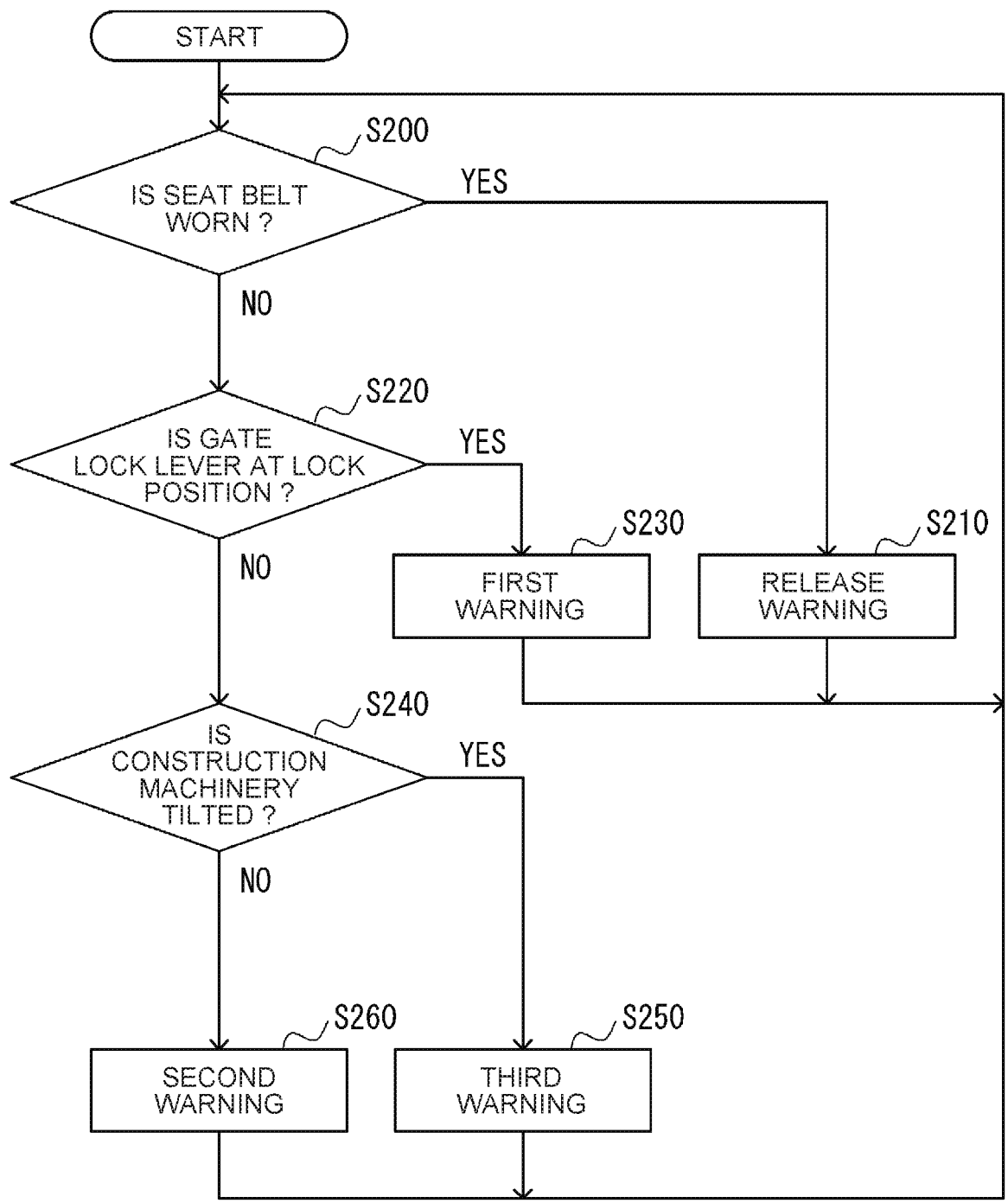
FIG. 5 is a flowchart that shows an example of a process in the safety device 10B related to the second embodiment.

FIG. 5 is a flowchart that shows an example of a process executed in the controller 20B. The process shown in the flowchart of FIG. 5 is started, for example, when the status the operation position of the key is at ON.

In step S200, the controller 20B determines whether the operator is wearing the seat belt on the basis of the seat belt status signal. The process proceeds to step S210 when the affirmative determination in step S200, and the process proceeds to step S220 when the negative determination in step S200. In step S210, the controller 20B makes the warning section 30 release the warning.

In step S220, the controller 20B determines whether the operation position of the gate lock lever is at the lock position on the basis of the gate lock lever status information. The process proceeds to step S230 when the affirmative determination in step S220, and the process proceeds to step S240 when the negative determination in step S220. In step S230, the controller 20B makes the warning section 30 give the first warning.

In step S240, the controller 20B determines whether the hydraulic excavator 100 tilts relative to the horizontal plane on the basis of the tilting information. The process proceeds to step S250 when the affirmative determination in step S240, and the process proceeds to step S260 when the negative determination in step S240. In step S260, the controller 20B makes the warning section 30 give the second warning whose attention arousing performance is higher than that of the first warning.

In step S250, the controller 20B makes the warning section 30 give the third warning whose attention arousing performance is higher than that of the second warning. The warning section 30 gives the third warning when the seat belt is determined to be not yet worn, the gate lock lever is determined to be at the lock release position, and the hydraulic excavator 100 is determined to be tilted. As the third warning, the warning section 30 flickers the seat belt warning lamp and outputs the warning sound, for example. In addition, the warning section 30 may be configured that the sound volume of the warning sound increases as tilting of the hydraulic excavator 100 becomes larger.

According to the embodiment described above, following actions and effects are secured in addition to the actions and effects similar to those of the first embodiment.

(4) The status information acquired by the status information acquisition section 24B includes information pertaining to the tilting status of the hydraulic excavator 100. The control section 21 controls the warning section 30 so that a warning is given when the hydraulic excavator 100 tilts relative to the horizontal plane. According to the present embodiment, it was configured that, when the hydraulic excavator 100 tilted relative to the horizontal plane, such warning was given that had higher attention arousing performance compared to the case the hydraulic excavator 100 did not tilt relative to the horizontal plane. Thus, it is possible to alert the operator according to the tilting status of the hydraulic excavator 100.

(5) According to the construction machine described in Patent Literature 1, operation is disabled when the seat belt is determined to be not yet worn. However, if operation is disabled when the construction machine tilts, there is a risk that the danger avoiding action may be delayed. In contrast, according to the second embodiment, since the warning is given to the operator according to the tilting status of the hydraulic excavator 100, the operator can take appropriate response such as moving the hydraulic excavator 100 to a safe place.

(Third Embodiment)

Figure 6:
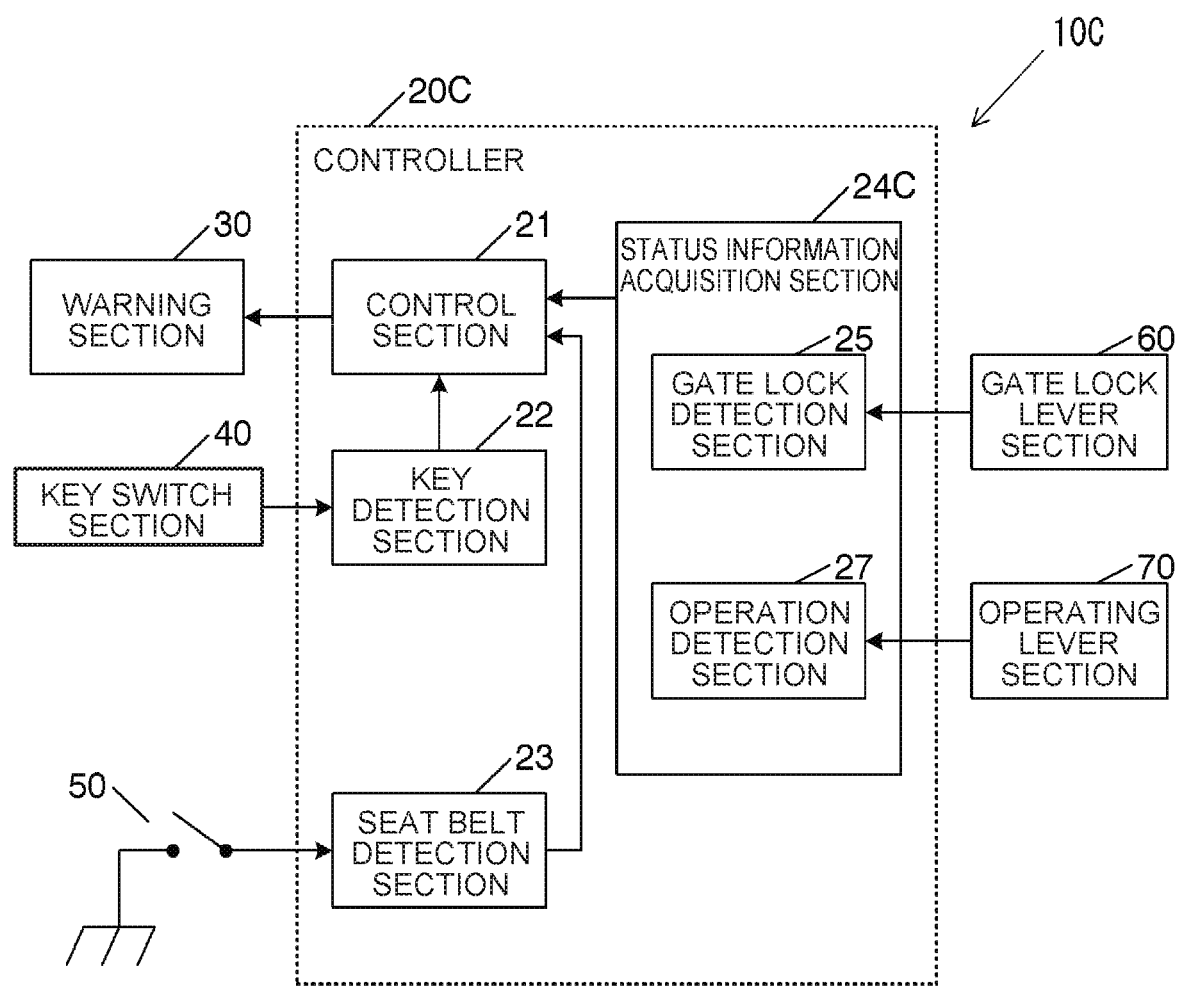
FIG. 6 is a block diagram that shows a configuration of a safety device 10C related to a third embodiment.

A safety device 10C for construction machine related to a third embodiment will be explained referring to FIG. 6. In addition, in FIG. 6, a portion same or equivalent to that of the first and second embodiments will be given a same reference sign, and different points will be mainly explained. FIG. 6 is a block diagram that shows a configuration of the safety device 10C related to the third embodiment. According to the third embodiment, warning is controlled using the gate lock lever status information and the operating lever status information of the hydraulic excavator 100 as the status information.

According to the third embodiment, a controller 20C includes a status information acquisition section 24C. The status information acquisition section 24C includes the gate lock detection section 25 and the operation detection section 27. The controller 20C is connected to the gate lock lever section 60, an operating lever section 70, and the like.

The operating lever section 70 includes operating levers, a pilot valve, and a pilot pressure sensor. The operating levers are various types of operating levers for the hydraulic excavator 100 of the operating member for the front working device, the operating member for traveling, the operating member for turning, and the like. The pilot valve outputs the pilot pressure that corresponds to the operation quantity of the operating lever. The pilot pressure sensor detects the pilot pressure, and generates a detection signal that corresponds to the pilot pressure. The operating lever section 70 outputs the detection signal that corresponds to the pilot pressure to the controller 20C.

The operation detection section 27 determines whether the operating lever is operated on the basis of the detection signal that corresponds to the value of the pilot pressure outputted by the operating lever section 70, and generates the operating lever status information that corresponds to the determination result. For example, the operation detection section 27 determines that the operating lever is operated when the value of the pilot pressure that corresponds to the status of the operating lever is a predetermined value or more, and determines that the operating lever is not operated when the value of the pilot pressure is less than the predetermined value.

Figure 7:
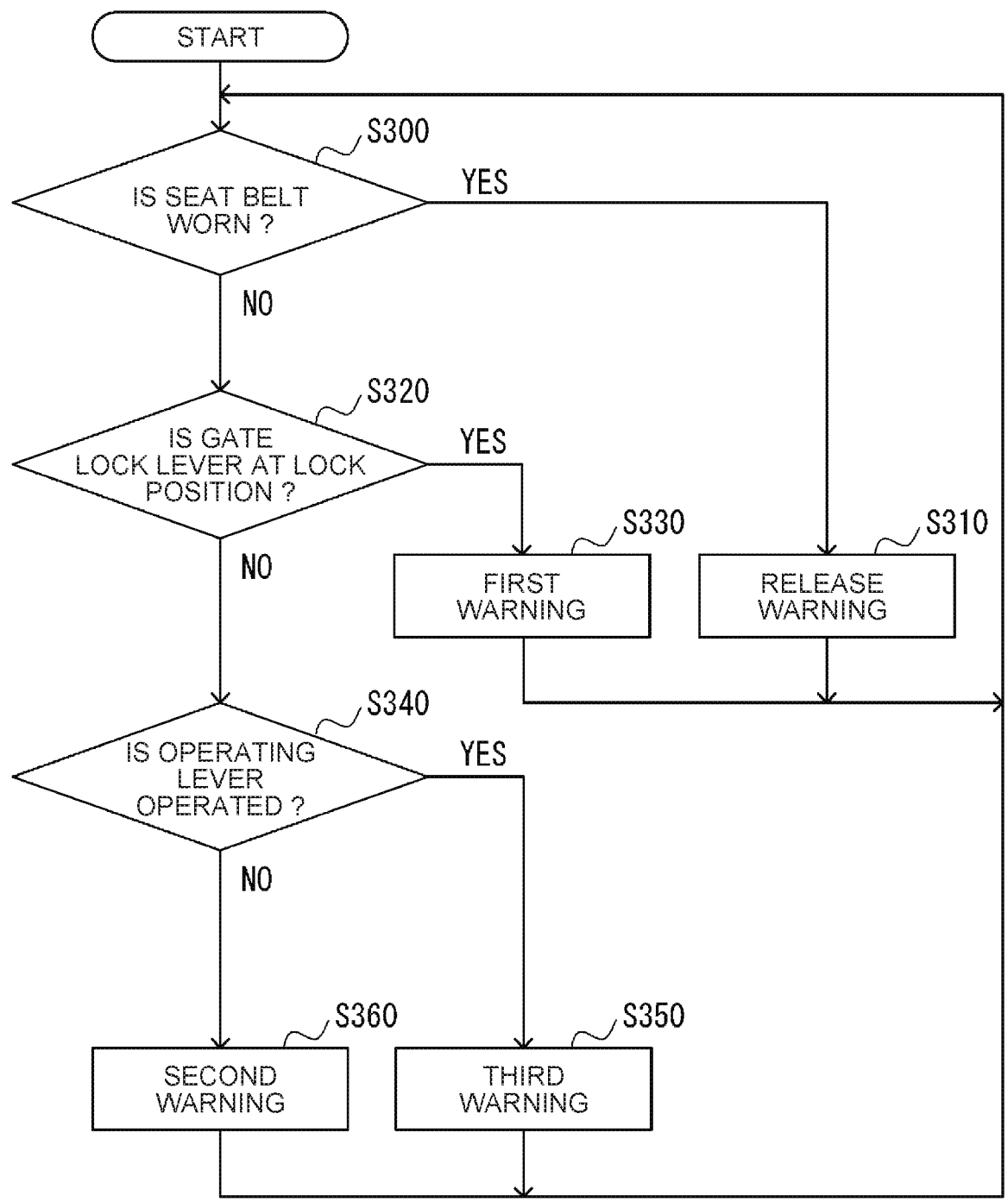
FIG. 7 is a flowchart that shows an example of a process in the safety device 10C related to the third embodiment.

FIG. 7 is a flowchart that shows an example of a process executed in the controller 20C. The process shown in the flowchart of FIG. 7 is started, for example, when the status the operation position of the key is at ON.

In step S300, the controller 20C determines whether the operator is wearing the seat belt on the basis of the seat belt status signal. The process proceeds to step S310 when the affirmative determination in step S300, and the process proceeds to step S320 when the negative determination in step S300. In step S310, the controller 20C makes the warning section 30 release the warning.

In step S320, the controller 20C determines whether the operation position of the gate lock lever is at the lock position on the basis of the gate lock lever status information. The process proceeds to step S330 when the affirmative determination in step S320, and the process proceeds to step S340 when the negative determination in step S320. In step S330, the controller 20C makes the warning section 30 give the first warning.

In step S340, the controller 20C determines whether the operating lever of the hydraulic excavator 100 is operated on the basis of the operating lever status information. The process proceeds to step S350 when the affirmative determination in step S340, and the process proceeds to step S360 when the negative determination in step S340. In step S360, the controller 20C makes the warning section 30 give the second warning.

In step S350, the controller 20C makes the warning section 30 give the third warning. The warning section 30 gives the third warning when the seat belt is determined to be not yet worn, the gate lock lever is determined to be at the lock release position, and the operating lever is determined to be operated.

According to the embodiment described above, following actions and effects are secured in addition to the actions and effects similar to those of the first embodiment.

(6) The status information acquired by the status information acquisition section 24C includes information pertaining to the status of the operating levers of the hydraulic excavator 100. The control section 21 controls the warning section 30 so that a warning is given when the operating lever of the hydraulic excavator 100 is operated. According to the present embodiment, it was configured that, when the operating lever is operated, such warning was given that had higher attention arousing performance compared to the case the operating lever was not operated. Thus, it is possible to alert the operator according to the status of the operating levers of the hydraulic excavator 100.

(Fourth Embodiment)

Figure 8:
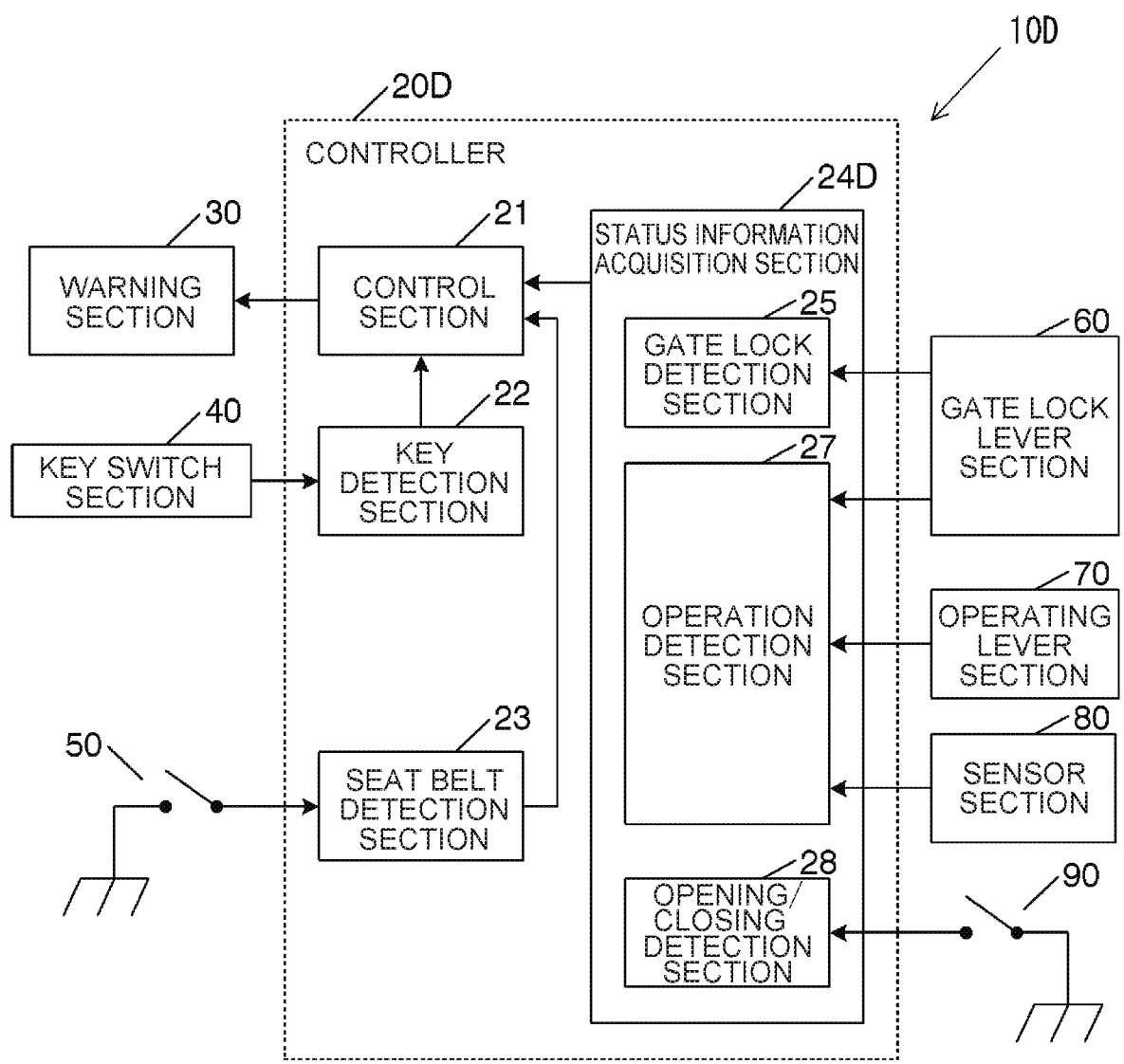
FIG. 8 is a block diagram that shows a configuration of a safety device 10D related to a fourth embodiment.

A safety device 10D for construction machine related to a fourth embodiment will be explained referring to FIG. 8. In addition, in FIG. 8, a portion same or equivalent to that of the first to third embodiments will be given a same reference sign, and different points will be mainly explained. FIG. 8 is a block diagram that shows a configuration of the safety device 10D related to the fourth embodiment. According to the fourth embodiment, warning is controlled using the gate lock status information, the opening/closing information pertaining to the opening/closing status of the door and the window of the cab 107, and the vehicle body operation information as the status information.

According to the fourth embodiment, a controller 20D includes a status information acquisition section 24D. The status information acquisition section 24D includes the gate lock detection section 25, the operation detection section 27, and an opening/closing detection section 28. The controller 20D is connected to the gate lock lever section 60, the operating lever section 70, the sensor section 80, a cab door switch section 90, and the like.

The cab door switch section 90 outputs an electric signal that corresponds to the opening/closing status of the door of the cab 107 and an electric signal that corresponds to the opening/closing status of the window of the cab 107 to the controller 20D.

The opening/closing detection section 28 detects the opening/closing status of the door on the basis of the electric signal that corresponds to the opening/closing status of the door, and detects the opening/closing status of the window on the basis of the electric signal that corresponds to the opening/closing status of the window. The opening/closing detection section 28 acquires opening/closing information that corresponds to the detection result.

The operation detection section 27 detects whether the operator is operating the hydraulic excavator 100 on the basis of at least one of the operation position of the gate lock lever, the status of the operating levers, the status of the travel pedal, and the engine rotational speed. The operation detection section 27 acquires vehicle body operation information that corresponds to the detection result.

The operation detection section 27 detects that the hydraulic excavator 100 is operated, for example, when the status information that corresponds to the operation position of the gate lock lever is the ON-signal, that is, when the gate lock lever is at the lock release position. The operation detection section 27 detects that the hydraulic excavator 100 is operated when the value of the pilot pressure that corresponds to the status of the operating lever is a predetermined value or more. The operation detection section 27 detects that the hydraulic excavator 100 is operated when the pilot pressure that corresponds to the status of the travel pedal is a predetermined value or more. The operation detection section 27 detects that the hydraulic excavator 100 is operated when the engine rotational speed detected by the rotational speed sensor is a predetermined rotational speed or more.

Figure 9:
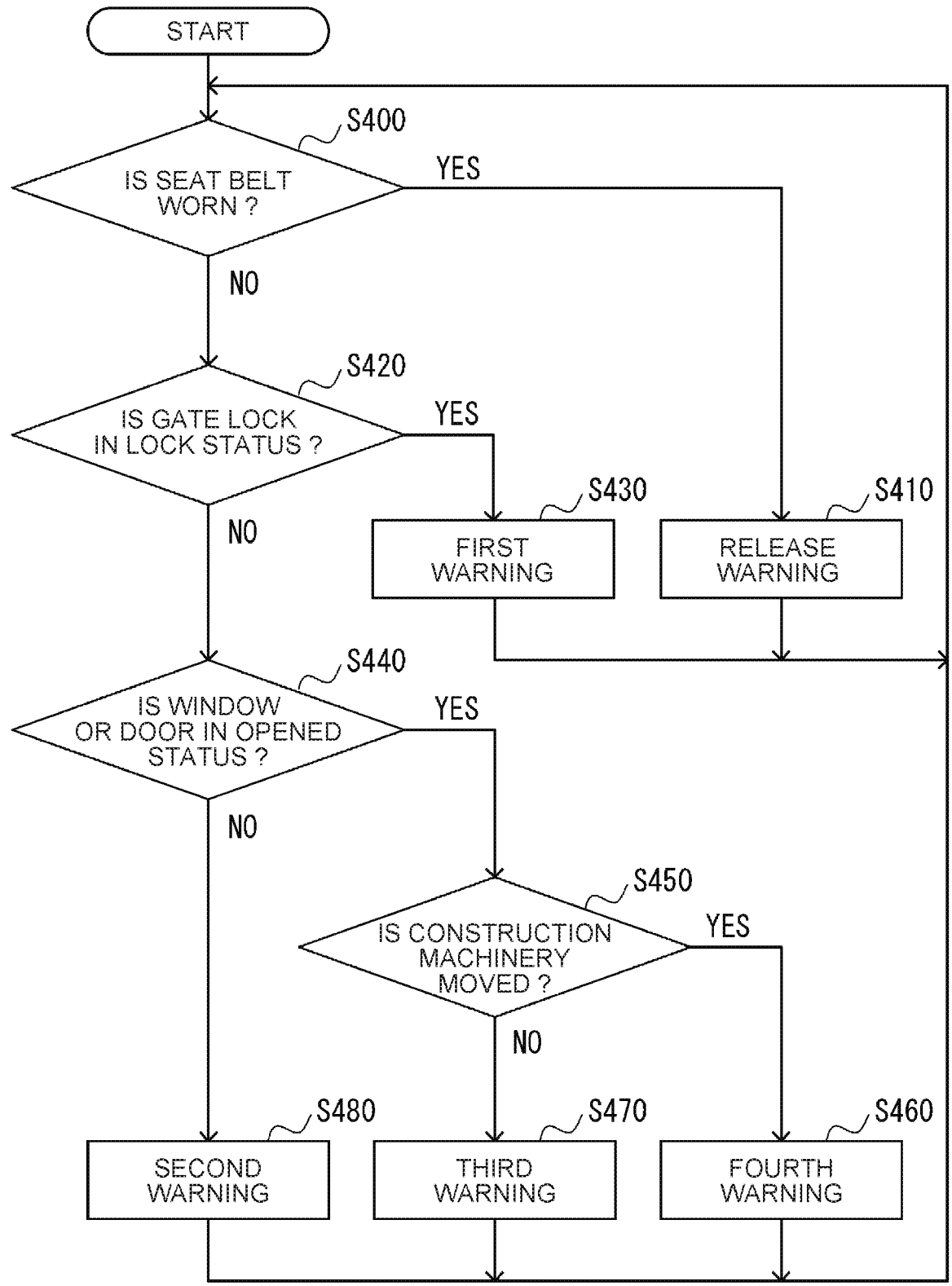
FIG. 9 is a flowchart that shows an example of a process in the safety device 10D related to the fourth embodiment.

FIG. 9 is a flowchart that shows an example of a process executed in the controller 20D. The process shown in the flowchart of FIG. 9 is started, for example, when the status the operation position of the key is at ON.

In step S400, the controller 20D determines whether the operator is wearing the seat belt on the basis of the seat belt status signal. The process proceeds to step S410 when the affirmative determination in step S400, and the process proceeds to step S420 when the negative determination in step S400. In step S410, the controller 20D makes the warning section 30 release the warning.

In step S420, the controller 20D determines whether the operation position of the gate lock lever is at the lock position on the basis of the gate lock lever status information. The process proceeds to step S430 when the affirmative determination in step S420, and the process proceeds to step S440 when the negative determination in step S420. In step S430, the controller 20D makes the warning section 30 give the first warning.

In step S440, the controller 20D determines whether the window or the door of the cab 107 of the hydraulic excavator 100 is open on the basis of the opening/closing information. The process proceeds to step S450 when the affirmative determination in step S440, and the process proceeds to step S480 when the negative determination in step S440. In step S480, the controller 20D makes the warning section 30 give the second warning.

In step S450, the controller 20D determines whether the hydraulic excavator 100 is operated on the basis of the vehicle body operation information. The process proceeds to step S460 when the affirmative determination in step S450, and the process proceeds to step S470 when the negative determination in step S450. In step S470, the controller 20D makes the warning section 30 give the third warning whose attention arousing performance is higher than that of the second warning.

In step S460, the controller 20D makes the warning section 30 give the fourth warning whose attention arousing performance is higher than that of the third warning. The warning section 30 gives the fourth warning when the seat belt is determined to be not yet worn, the gate lock lever is determined to be at the lock release position, the window or the door of the cab 107 is determined to be open, and the hydraulic excavator 100 is determined to be operated. As the fourth warning, for example, the warning section 30 flickers the seat belt warning lamp, outputs a warning sound, and changes the tone or the sound volume of the warning sound with respect to the case of the third warning.

According to the embodiment described above, following actions and effects are secured in addition to the actions and effects similar to those of the first embodiment.

(7) The status information acquired by the status information acquisition section 24D includes information pertaining to the opening/closing status of the window or the door of the cab 107 of the hydraulic excavator 100, and information pertaining to the operation status of the hydraulic excavator 100. The control section 21 controls the warning section 30 so that a warning is given when the hydraulic excavator 100 is operated in the status the window or the door is open. Thus, it is possible to alert the operator according to the opening/closing status of the window or the door of the cab 107 of the hydraulic excavator 100 and the operation status of the hydraulic excavator 100.

Such modifications as described below are also within the range of the present invention, and it is also possible to combine one or plural modification examples with the embodiments described above.

FIRST MODIFICATION EXAMPLE

In the fourth embodiment described above, such example was explained that the third or fourth warning was given according to the vehicle body operation information when the seat belt was determined to be not yet worn, the gate lock lever was determined to be at the lock release position, and the window or the door of the cab 107 was determined to be open. However, it is also possible to give a warning triggered only by an event that the window or the door of the cab 107 has been determined to be open.

SECOND MODIFICATION EXAMPLE

Although the embodiments described above were explained with the example of the hydraulic excavator 100 as the construction machine, the present invention is not limited to it, and can be applied to other construction machine such as a wheel loader, fork lift, telehandler, lift truck, dump truck, and a crane, for example.

Although various embodiments and modification examples were explained above, the present invention is not limited to the contents of them. Other aspects that can be considered within the range of the technical thought of the present invention are to be also included within the range of the present invention.

REFERENCE SIGNS LIST

10 . . . Safety device
21 . . . Control section
23 . . . Seat belt detection section
24 . . . Status information acquisition section
30 . . . Warning section
100 . . . Hydraulic excavator (a construction machine)

The invention claimed is:

1. A safety device for a construction machine provided with a front working device, the safety device comprising:
operating levers configured to provide operating instructions to the front working device:
a gate locking switch section that detects when an operation position of a gate lock lever is in a lock position in which the gate lock lever disables the operating instructions from the operating levers of the construction machine so that the front work device cannot be driven and when the operation position of the gate lock lever is in a lock release position, the gate lock lever enables the operating instructions from the operating levers of the construction machine so that the front work device is drivable;

seat belt switch section that outputs a signal corresponding to a wearing state of a seat belt provided on the construction machine:

a tilting angle sensor for detecting a tilting state of the construction machine;

a warning lamp and a speaker that issues a warning about the seat belt to an operator of the construction machine; and a controller that is connected to the gate locking switch, the tilting angle sensor, the warning lamp, the speaker, and the seat belt switch section, wherein the controller:

detects, based on a signal from the seat belt switch, whether or not the seat belt is worn by the operator;

detects, based on a signal from the gate locking switch section, that the gate lock lever is in the lock position or in the lock release position;

detects, based on a signal from the tilting angle sensor, whether or not the construction machine is tilted with respect to the horizontal plane, and wherein when the controller detects that the seat belt is not worn by the operator and the operation position of the gate lock lever is in the lock position, the controller gives a first warning that turns on the warning lamp;

when the controller detects that the seat belt is not worn by the operator and that the operation position of the gate lock lever is in the lock release position and the construction machine is not tilted with respect to the horizontal plane, the controller gives a second warning with an attention arousing performance that is higher than that of the first warning and flickers the warning lamp; and when the controller detects that the seat belt is not worn by the operator, that the operation position of the gate lock lever is in the lock release position, and that the construction machine is tilted with respect to the horizontal plane, the controller gives a third warning with an attention arousing performance that is higher than that of the second warning, flickers the warning lamp, and outputs a warning sound from the speaker with a sound volume of the warning sound that increases as the tilting state becomes larger.

2. The safety device for a construction machine according to claim 1, wherein the controller receives information pertaining to an opening/closing status of a window or a door of a cab of the construction machine, and the controller gives a warning when the information pertaining to the opening/closing status indicates that the window or the door is opened.

3. The safety device for a construction machine according to claim 2, wherein the controller acquires information on a status of a travel pedal and an engine rotational speed.

* * * * *